March 18, 1930.   E. A. NELSON ET AL   1,751,097
DENTAL INVESTMENT MIXER
Filed Sept. 19, 1928
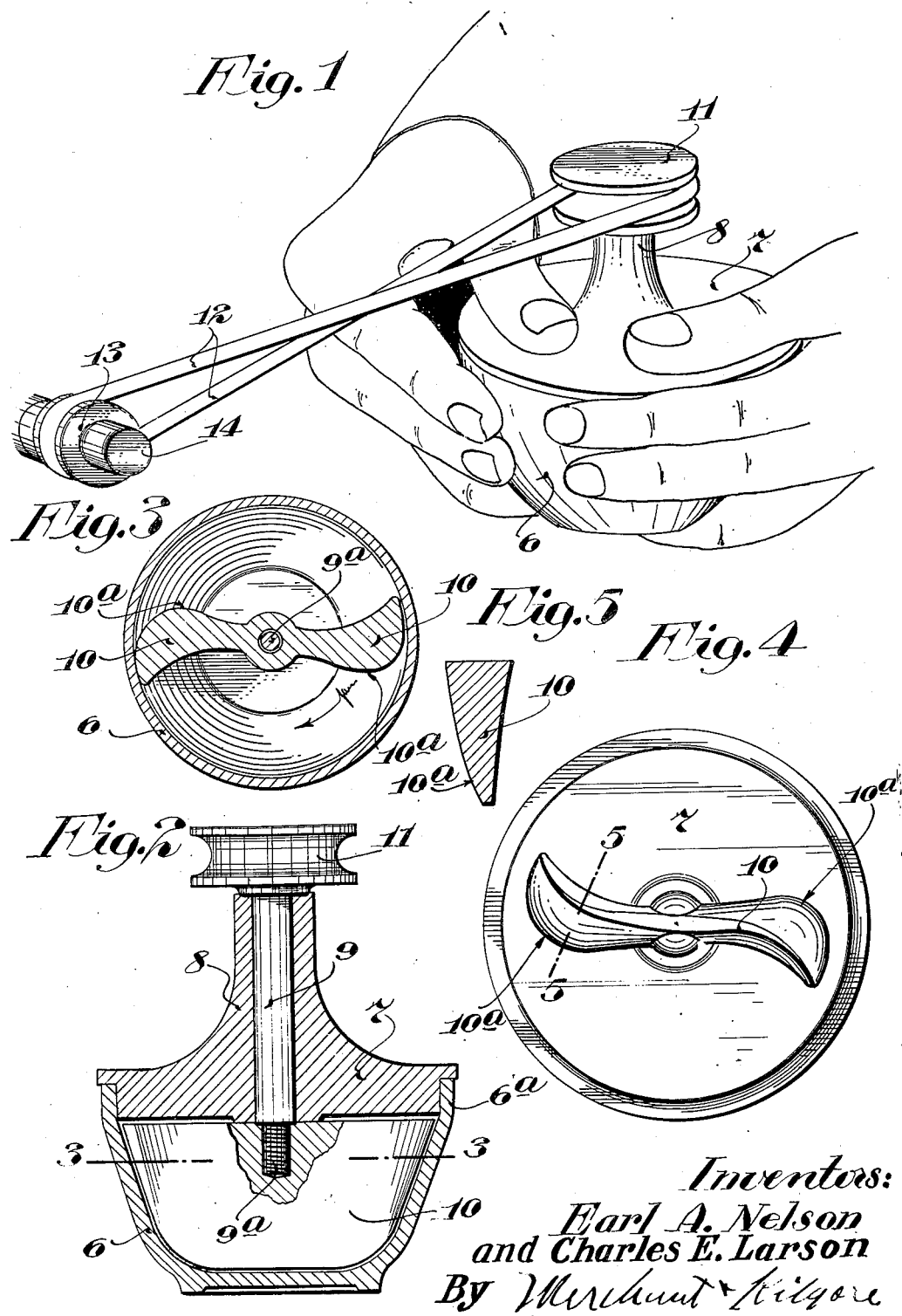
Inventors:
Earl A. Nelson
and Charles E. Larson
By Merchant & Kilgore Patented Mar. 18, 1930

1,751,097

UNITED STATES PATENT OFFICE

EARL ALLEN NELSON, OF MINNEAPOLIS, AND CHARLES E. LARSON, OF ST. LOUIS PARK, MINNESOTA

DENTAL INVESTMENT MIXER

Application filed September 19, 1928. Serial No. 307,026.

Our invention provides an extremely simple and highly efficient device for mixing plastic materials and is especially designed and particularly adapted for mixing dental investment material used in making molds for dental castings. The device is adapted to be held in the hands and to be driven through a belt from a pulley on a power driven spindle. The device comprises a bowl, a cover therefor, and on the cover a spindle that carries a paddle of novel construction and arrangement arranged to be rotated within the bowl, and to co-operate therewith in a peculiar and novel manner.

A commercial form of the device is illustrated in the accompanying drawings, wherein like characters indicate like parts throughout the several views.

Referring to the drawings:

Fig. 1 is a perspective showing the device and illustrating the manner in which it is adapted to be held in the hands and to be power driven;

Fig. 2 shows the mixing device chiefly in axial section but with some parts in elevation;

Fig. 3 is a horizontal section taken on the line 3—3 of Fig. 2;

Fig. 4 is a bottom plan view of the cover showing the mixing paddle applied thereto; and Fig. 5 is a detail in section on the line 5—5 of Fig. 4.

This improved dental mixer, which is sometimes designated as a spatulating device, in its preferred commercial embodiment, includes a flexible bowl 6 preferably of pliable rubber having upwardly flaring walls that terminate in a cylindrical rim portion $6^a$. The cylindrical portion $6^a$ of this bowl is adapted to be telescoped under friction onto the cylindrical portion of a flanged cover 7 which has an upstanding tubular hub 8. A spindle 9 is extended axially through and journaled in the cover 7 and its hub 8. To the lower end of the spindle 9 is attached a mixer in the nature of a spatulating blade 10 of novel construction. This blade 10, at its central portion, has a threaded seat adapting it be screwed onto a reduced threaded end $9^a$ of the spindle 9. In horizontal section, see particularly Fig. 3, the blade 10 has curved operating surfaces $10^a$ which, as the curve approaches the interior of the bowl, increases its curvature backward in respect to the direction of rotation of the blade so that said curved surfaces blend approximately into tangential contact with the interior of the bowl. This feature is highly important as will appear from the description of the operation.

In vertical longitudinal diametrical section, the blade 10 is shaped so that it conforms to the interior of the bowl and so that it will therefore have close contact or run close to the inner surface of the bowl. In vertical cross-section, see particularly Fig. 5, the blade tapers from a quite wide upper surface down to an approximate edge at its lower portion and this feature is also important as will presently appear. The proper direction of rotation of the blade 10 is indicated by the arrow marked on Fig. 3, or, otherwise stated, said blade will be rotated in a clockwise direction in respect to Fig. 3 and in a counter-clockwise direction in respect to the bottom plan view, Fig. 4.

The device is intended to be driven by power afforded by a power-driven shaft and hence the spindle 9, at its upper end, as shown, is provided with a pulley 11 so that it may be driven from a belt 12 running over a driving pulley 13 on a power-driven shaft 14 when the device is held in the hands, as shown in Fig. 1. By reference to Fig. 1 it will be noted that the device is of such shape that the bowl may be firmly held and the cover firmly held on the bowl while the device is driven, as shown in Fig. 1. Here it is important to note that the hub 8 is of such length or height that there is ample clearance for the thumbs of the operator between the belt and the cover.

When the proper amount of investment material and water is placed in the bowl, the cover is then placed on the bowl and the blade 10 rotated while the device is held as shown in Fig. 1. The blade 10, acting upon the plastic material, will cause the material to rotate and to be thrown outward and pressed against the interior of the bowl, partly by the action of centrifugal force and partly by the curved formations of the active portions 10ª of said blade. In view of the downward tapered form of the blade, the plastic material will be continuously worked downward toward the bottom of the bowl, while it is being pressed outward against the bowl. The plastic material pressed between the interior of the bowl and the backwardly curved outer portions of the blade will be rubbed and pressed against the bowl, thereby producing a complete and thorough mixing of the plastic material which breaks up all of the particles, pressing thin layers constantly against the interior of the bowl.

Obviously, in view of the fact that the outer curved portions of the blade curve approximately into tangential contact with the bowl, the paste or plastic material will be subjected to considerable pressure as it is reduced to a thin film against the interior of the bowl. Here it is also important to note that inasmuch as the blade being of metal will not yield, that it is important that the bowl should be of flexible or elastic material such as rubber so that hard particles will neither block the rotation of the blade nor break the bowl, but will, by repeated rubbing pressure, be finally reduced to the finest possible kind of pasty condition.

This mixing device very rapidly accomplishes a mixing operation that is more thorough and complete than can be accomplished by hand operations even when a large amount of time is consumed in such hand operations. The efficiency of this device has been thoroughly demonstrated in practice.

What we claim is:

1. A mixing device of the kind described comprising a bowl of yielding material and a spatulating blade of unyielding material arranged to rotate within and formed at its outer portions on lines that approximately fit the interior of the bowl, and the oppositely projecting arms of said blade having operative surfaces that are backwardly curved in respect to the direction of rotation of the blade so that the curved portions thereof blend approximately into tangential contact with the bowl.

2. A mixing device of the kind described comprising a bowl of yielding rubber and a spatulating blade of non-yielding metal arranged to rotate within and formed at its outer portions on lines that approximately fit the interior of the bowl, and the oppositely projecting arms of said blade having operative surfaces that are backwardly curved in respect to the direction of rotation of the blade so that the curved portions thereof blend approximately into tangential contact with the bowl.

3. A mixing device of the kind described comprising a bowl, a detachable cover for said bowl, a spindle axially journaled in and extended through said cover, and on the lower end of said spindle a spatulating blade, the outer portion of which is shaped to fit and runs in close contact with the interior of the bowl, said blade having an operative surface formed on a curved line turned backward in respect to the direction of rotation of the blade so that it blends approximately into tangential contact with the bowl, and a pulley applied to the outer end of said spindle in fixed relation to said cover and removable with said cover and adapting said spindle and blade to be rotated by a power-driven belt while the bowl and cover are held together by the hands of the operator, said blade being of unyielding material and said bowl being of flexible material.

4. A mixing device of the kind described comprising a bowl having upwardly flaring walls, a cover having a reduced portion adapted to be telescoped into the bowl and having a raised axial hub, a spindle extended through and journaled in said cover and its hub, a pulley applied to the upper end of said spindle in fixed relation to said cover and removable with said cover and adapting the said spindle to be power-driven through a belt, and on the lower end of said spindle a spatulating blade formed at its outer portion on lines that approximately fit the interior of the bowl, said blade in vertical cross-section being downwardly tapered, and the oppositely projecting arms of said blade having operative surfaces that are backwardly curved in respect to the direction of rotation of the blade so that said curved portions blend approximately into tangential contact with the bowl, said blade being of metal and said bowl being of flexible rubber.

In testimony whereof we affix our signatures.

EARL ALLEN NELSON.
CHARLES E. LARSON.